US010050263B2

(12) United States Patent
Bi et al.

(10) Patent No.: US 10,050,263 B2
(45) Date of Patent: Aug. 14, 2018

(54) MODIFIED LITHIUM ION BATTERY ANODE MATERIAL HAVING HIGH ENERGY DENSITY, AND MANUFACTURING METHOD THEREOF

(71) Applicant: Ningbo Institute of materials Technology & Engineering, Chinese Academy of Science, Ningbo, Zhejiang (CN)

(72) Inventors: Yujing Bi, Zhejiang (CN); Chenyun Wang, Zhejiang (CN); Jingjing Zhou, Zhejiang (CN); Huan Lin, Zhejiang (CN); Deyu Wang, Zhejiang (CN)

(73) Assignee: Ningbo Institute of Materials Technology & Engineering, Chinese Academy of Sciences, Zhejiang (CN)

( * ) Notice: Subject to any disclaimer, the term of this patent is extended or adjusted under 35 U.S.C. 154(b) by 480 days.

(21) Appl. No.: 14/438,875

(22) PCT Filed: Nov. 30, 2012

(86) PCT No.: PCT/CN2012/085653
§ 371 (c)(1),
(2) Date: Apr. 27, 2015

(87) PCT Pub. No.: WO2014/063407
PCT Pub. Date: May 1, 2014

(65) Prior Publication Data
US 2015/0255789 A1    Sep. 10, 2015

(30) Foreign Application Priority Data

Oct. 25, 2012  (CN) .......................... 2012 1 0413276

(51) Int. Cl.
*H01M 4/36* (2006.01)
*C01G 53/04* (2006.01)
(Continued)

(52) U.S. Cl.
CPC ............ *H01M 4/366* (2013.01); *C01G 51/50* (2013.01); *C01G 53/04* (2013.01); *C01G 53/40* (2013.01);
(Continued)

(58) Field of Classification Search
CPC ........................... H01M 4/366; C01P 2004/32
See application file for complete search history.

(56) References Cited

FOREIGN PATENT DOCUMENTS

| CN | 102110808 A | 6/2011 |
|---|---|---|
| CN | 10246877 A | 5/2012 |

(Continued)

OTHER PUBLICATIONS

PCT Search Report PCT/CN2012/085653 dated May 22, 2013 6 pages.
International Preliminary Report on Patentability and Annexes 9 pages.

*Primary Examiner* — Stephan Essex
(74) *Attorney, Agent, or Firm* — Flaster/Greenberg, PC

(57) ABSTRACT

The present invention relates to a modified lithium ion battery anode material having high energy density, and a manufacturing process thereof, the anode material comprising, from inside to outside, a core, a transition layer and a shell layer. The anode material of the present invention has the advantages of high energy density, low surface activity, good storage performance, and a simple manufacturing process, and is suitable for large scale application.

11 Claims, 6 Drawing Sheets

(51) Int. Cl.
<table>
<tr><td>H01M 10/0525</td><td>(2010.01)</td></tr>
<tr><td>H01M 4/04</td><td>(2006.01)</td></tr>
<tr><td>H01M 4/505</td><td>(2010.01)</td></tr>
<tr><td>H01M 4/525</td><td>(2010.01)</td></tr>
<tr><td>H01M 4/485</td><td>(2010.01)</td></tr>
<tr><td>H01M 10/052</td><td>(2010.01)</td></tr>
<tr><td>H01M 4/62</td><td>(2006.01)</td></tr>
<tr><td>C01G 51/00</td><td>(2006.01)</td></tr>
<tr><td>C01G 53/00</td><td>(2006.01)</td></tr>
<tr><td>H01M 4/02</td><td>(2006.01)</td></tr>
</table>

(52) U.S. Cl.
CPC ....... *H01M 4/0416* (2013.01); *H01M 4/0471* (2013.01); *H01M 4/485* (2013.01); *H01M 4/505* (2013.01); *H01M 4/525* (2013.01); *H01M 4/62* (2013.01); *H01M 10/052* (2013.01); *H01M 10/0525* (2013.01); *C01P 2002/70* (2013.01); *C01P 2004/03* (2013.01); *C01P 2004/32* (2013.01); *C01P 2004/84* (2013.01); *H01M 2004/027* (2013.01)

(56) References Cited

FOREIGN PATENT DOCUMENTS

| | | |
|---|---|---|
| CN | 102569775 A | 7/2012 |
| CN | 102610822 A * | 7/2012 |

\* cited by examiner

MODIFIED LITHIUM ION BATTERY ANODE MATERIAL HAVING HIGH ENERGY DENSITY, AND MANUFACTURING METHOD THEREOF

BACKGROUND OF THE INVENTION

Field of the Invention

The invention relates to the field of energy materials, and, in particular, to a modified lithium ion battery anode material having high energy density, and manufacturing method thereof.

Description of Related Art

Lithium-ion battery has prominent advantages such as high energy density, long cycle life, low self-discharge rate, no memory effect, good security, etc., which results that there is a wide range of applications in the production and life, such as portable electronics, power supply, energy storage power plants and other areas. With the demand for improvement of living standards and technological progress, the development of lithium-ion batteries also made many new requirements, and there is urgent need to develop a higher energy density, better safety battery.

To improve and enhance the performance of the anode material, which is one of the core parts of lithium-ion battery, is one of the key point to enhance the performance of lithium-ion batteries, and also the focus of research and development.

The use of Nickel, cobalt and manganese ternary layered material gradually increases in practical applications since it has more prominent advantages. Among that, high-nickel ternary layered material, because of its high capacity, good rate performance, low price, is considered as the most promising used anode material in digital products, hybrid electric vehicles, plug-in electric vehicles, pure electric vehicles and other power batteries.

High nickel material has the shortcomings such as high surface activity, readily reduced for nickel, etc., so the present-used improved method is to coat the material surface with a layer of inert material, such as $Al_2O_3$, MgO, $SiO_2$, $AlF_3$, $Ni_3(PO_4)_2$, $AlPO_4$, etc. Currently, most of the coating process is carried out to the sintered material. For example, first, preparing the Ni, Co, Mn hydroxide or carbonate precursor, and sintering after mixed with the lithium salt, thereby obtaining the nickel-cobalt-manganese ternary layered material, then continue to subsidencing or adsorbing hydroxides, carbonates corresponding to the coating material to the surface. Hydroxides or carbonates decompose at high temperatures into the corresponding coating material by calcining again, thus getting the coated anode material.

The principle of coating is to reduce the direct contact of high nickel material to the air and electrolytic solution. $H_2O$ is the most harmful to the electrode material in the electrolytic solution, which can react with the electrolyte to generate HF etching electrode dissolution of transition metals in the anode material. After coating with the oxide, the trace HF in the electrolyte would react with the oxide to result corresponding fluoride deposited on the surface and continue to play a protective role of the anode material. Although this process is capable of forming a cladding layer, but due to the coating process typically requires a treatment in which sintered high nickel material should be placed in water or an organic solvent, which requires an additional secondary calcination. Moreover, $Ni^{3+}$ in some lattices will inevitably be reduced to NiO during calcination, which results in the forming of spinel phase in local, and causing the material to reduce capacity, cycle degradation, gas producing, and increase of the battery safety hazard. In addition, the coating content of the current coating method and process is of comparatively small amount, thus unable to form a uniform coating layer. Also, the cladding layer is not electrochemically active material and do not possess deintercalation capacity for the lithium ions.

Consequently, there is an urgent need to provide a method for preparing a new anode material so as to make the nickel element in the core part difficult to spread to the surface and being reduced.

BRIEF SUMMARY OF THE INVENTION

The objective of the present invention is to provide a novel anode material and its manufacturing method and use thereof, which can effectively reduce the nickel element content of its surface.

In the first aspect of the present invention, it provides an anode material, which comprises a core, a transition layer, a shell layer from inside to outside.

In another preferred embodiment, the anode material is of spherical structure.

In another preferred embodiment, the anode material further comprises a protective layer outside the shell layer.

In another preferred embodiment, the shell layer is $Li_{1+x}Ni_{1-y-z}Co_yMn_zO_2$, wherein $-0.1 \leq x \leq 0.2$, $0.5 \leq y+z \leq 1$.

In another preferred embodiment, $0.5 \leq y \leq 1$, $0 \leq z \leq 1$.

In another preferred embodiment, the transition layer is selected from the group consisting of: $Al_2O_3$, $ZrO_2$, MgO, $SiO_2$, $ZnO_2$, $TiO_2$, $Y_2O_3$, $LiAlO_2$, $Li_2ZrO_3$, or combination thereof.

In another preferred embodiment, the core is $Li_{1+r}Ni_{1-s-t}Co_sMn_tO_2$, wherein $-0.1 \leq r \leq 0.2$, $0 \leq s+t \leq 0.5$.

In another preferred embodiment, $0 \leq s \leq 0.5$, $0 \leq t \leq 0.5$.

In another preferred embodiment, the protective layer is selected from the group consisting of: $Al_2O_3$, $ZrO_2$, MgO, $SiO_2$, $ZnO_2$, $TiO_2$, $Y_2O_3$, $LiAlO_2$, $Li_2ZrO_3$, or combination thereof.

In another preferred embodiment, the anode material contains core, transition layer, shell layer from inside to outside, wherein;

The shell layer is $Li_{1+x}Ni_{1-y-z}Co_yMn_zO_2$, wherein $-0.1 \leq x \leq 0.2$, $0.5 \leq y+z \leq 1$, $0.5 \leq y \leq 1$, $0 \leq z \leq 1$;

The transition layer is selected from the group consisting of: $Al_2O_3$, $ZrO_2$, MgO, $SiO_2$, $ZnO_2$, $TiO_2$, $Y_2O_3$, $LiAlO_2$, $Li_2ZrO_3$, or combination thereof;

The core is $Li_{1+r}Ni_{1-s-t}Co_sMn_tO_2$, wherein $-0.1 \leq r \leq 0.2$, $0 \leq s+t \leq 0.5$, $0 \leq s \leq 0.5$, $0 \leq t \leq 0.5$;

Optionally, the anode material also contains protective layer outside the shell layer, wherein the protective layer is selected from the group consisting of: $Al_2O_3$, $ZrO_2$, MgO, $SiO_2$, $ZnO_2$, $TiO_2$, $Y_2O_3$, $LiAlO_2$, $Li_2ZrO_3$, or combination thereof.

In another preferred embodiment, the rate of the total moles of Co, Ni, Mn in the protective layer and the total moles of Co, Ni, Mn in the core is ≤0.3.

In another preferred embodiment, the thickness of the transition layer is 1~50 nm, the thickness of shell layer is 50 nm~4 μm, the thickness of protective layer is 1~50 nm.

In another preferred embodiment, the shell layer and the core are both α-NaFeO$_2$ type lattice structure with a R-3mH space group.

In another preferred embodiment, the anode material has 1 to 10 layers of the transition layer and/or 1 to 10 layers of the shell layer.

In another preferred embodiment, the anode material has 1 to 5 layers of the transition layer and/or 1 to 5 layers of the shell layer; preferably, the anode material has 1 to 3 layers of the transition layer and/or 1 to 3 layers of the shell layer.

In another preferred embodiment, the Ni content in the core is greater than that in the shell layer.

In another preferred embodiment, the core is $LiNi_{0.8}Co_{0.1}Mn_{0.1}O_2$; the transition layer is $Li_2ZrO_3$; the shell layer is $LiNi_{1-y}Co_yMn_zO_2$, wherein $0.5 \leq y+z \leq 1$.

In the second aspect of the present invention, it provides a manufacturing method for the anode material in the first aspect of the present invention, wherein the method comprises the following steps of:

(a) providing a solution containing Ni, Co, and Mn salts, and preparing a precursor $Ni_{1-s-t}Co_sMn_t(OH)_2$, $0 \leq s+t \leq 0.5$;

(b) depositing a precursor of transition layer on surface of the precursor $Ni_{1-s-t}Co_sMn_t(OH)_2$, thereby obtaining a precursor P20;

(c) depositing a precursor of shell layer on surface of the precursor P20, thereby obtaining a precursor P30;

(d) mixing the precursor P30 with the lithium salt uniformly, sintering, thereby obtaining the anode material.

In step (a), in the atmosphere of air or inert gas, adding the solution containing Ni, Co, and Mn salts into an aqueous ammonia solution, while adjusting pH value to 7 to 14 by adding ammonia water and an alkaline solution, after precipitation, filtering, washing, and drying sedimentation to obtain the precursor $Ni_{1-s-t}Co_sMn_t(OH)_2$, $0 \leq s+t \leq 0.5$; wherein the inert gas is nitrogen, argon, or combination thereof, the Ni salt is selected from the group consisting of Ni sulfate, Ni nitrate, Ni chloride, and Ni acetate, or combination thereof; the Co salt is selected from the group consisting of Co sulfate, Co nitrate, Co chloride, acetates, or combination thereof; the Mn salt is selected from the group consisting of Mn sulfate, Mn nitrate, Mn chloride, Mn acetate, or combination thereof; the alkali is selected from the group consisting of NaOH, LiOH, and KOH, or combination thereof; and/or In step (a), after precipitation, continue to stir for 1-20 h(s).

In step (b), the precursor of the transition layer is hydroxide of A; wherein the A is selected from the group consisting of Al, Mg, Zr, Fe, V, Ti, Sr, Cr, Zn, Cu, Ni, Co, Mn, Y, or combination thereof.

In step (c), the precursor of the shell layer is hydroxide of B; wherein the B is selected from the group consisting of Ni, Co, Mn, or combination thereof.

In step (d), the lithium salt is selected from the group consisting of lithium carbonate, lithium hydroxide, lithium chloride, lithium nitrate, and lithium acetate, or combination thereof.

In step (d), the sintering atmosphere is selected from the group consisting of air, oxygen, nitrogen, argon, or combination thereof.

In another preferred embodiment, the method includes:

(a) in the atmosphere of air or inert gas, adding the solution containing Ni, Co, and Mn salts into an aqueous ammonia solution, while adjusting pH value to 7 to 14 by adding ammonia water and an alkaline solution, after precipitation, filtering, washing, and drying sedimentation to obtain the precursor $Ni_{1-s-t}Co_sMn_t(OH)_2$, $0 \leq s+t \leq 0.5$; wherein the inert gas is nitrogen, argon, or combination thereof, the Ni salt is selected from the group consisting of Ni sulfate, Ni nitrate, Ni chloride, and Ni acetate, or combination thereof; the Co salt is selected from the group consisting of Co sulfate, Co nitrate, Co chloride, acetates, or combination thereof; the Mn salt is selected from the group consisting of Mn sulfate, Mn nitrate, Mn chloride, Mn acetate, or combination thereof; the alkali is selected from the group consisting of NaOH, LiOH, and KOH, or combination thereof;

(b) depositing hydroxide of A on surface of precursor, thereby obtaining the precursor coated with hydroxide of A; wherein the A is selected from the group consisting of Al, Mg, Zr, Fe, V, Ti, Sr, Cr, Zn, Cu, Ni, Co, Mn, Y, or combination thereof;

(c) depositing hydroxide of B on surface of precursor coated with hydroxide of A, filtrating, washing and drying to obtain coated precursor; wherein the B is selected from the group consisting of Ni, Co, Mn, or combination thereof;

(d) mixing the coated precursor and the lithium salt uniformly, and sintering, thereby obtaining the anode material; wherein the lithium salt is selected from the group consisting of lithium carbonate, lithium hydroxide, lithium chloride, lithium nitrate, and lithium acetate, or combination thereof, the sintering atmosphere is selected from the group consisting of air, oxygen, nitrogen, argon, or combination thereof.

In another preferred embodiment, in step (d) sintering is carried out once or twice or more times (preferably 2 to 5 times), while the temperature of each latter sintering is 50-500° C. higher than that of the former one.

The method further comprises the following steps of:

(e) preparing the protective layer on surface of anode material obtained in step (d), wherein the protective layer is oxide of C, wherein the C is selected from the group consisting of: Al, Mg, Zr, Fe, V, Ti, Sr, Cr, Zn, Cu, Ni, Co, Mn, Y, or combination thereof.

In another preferred embodiment, in step (d), the molar ratio of the coated precursor to the lithium salt is 0.9-1.2.

In another preferred embodiment, the molar ratio of the total element content of the transition layer and that of the precursor $Ni_{1-y-z}Co_yMn_z(OH)_2$ is $\leq 0.3$; the molar ratio of the total element content in the shell layer and that in the precursor $Ni_{1-y-z}Co_yMn_z(OH)_2 \leq 0.3$.

In the third aspect of the present invention, it provides a lithium ion battery, which comprises the anode material in the first aspect of the present invention.

It should be understood that in the present invention, the technical features specifically above and below (such as the Examples) can be combined with each other, thereby constituting a new or preferred technical solution which needs not be individually described.

DETAILED DESCRIPTION OF THE INVENTION

Figure 1:
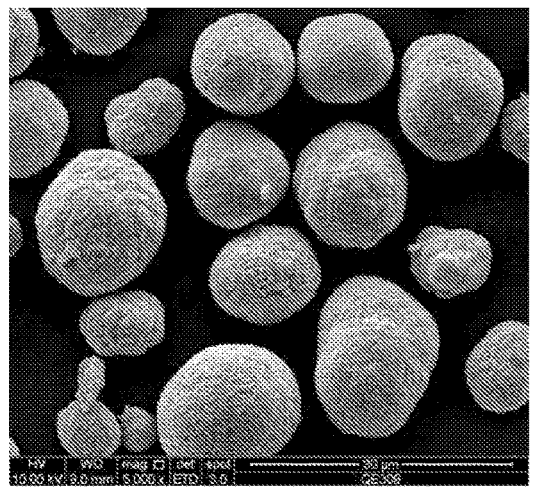
FIG. 1 shows scanning electron microscope pattern of the precursor, as prepared in comparative example 1.

Through comprehensive and intensive research, the inventors have unexpectedly discovered a novel method of preparing anode material. Treatments are conduct on the precursor surface to deposit or adsorb cladding before sintering, and after mixing with a lithium salt and sintering, an anode material having a core, a transition layer and a shell layer is obtained. The material is of high energy density, not requiring secondary treatment after sintering, storage-stable in air and with the active cladding. The present invention is accomplished based on the above findings.

Anode Material

The anode material of the present invention is an oxide electrode material with α-NaFeO$_2$ type crystal structure, by introduction of the transition layer between the core and the shell layer, not only did the electrochemical property of the anode material was ensured, but also the concentration of nickel of the material surface was reduced, which decreases the adverse effects of high-nickel material.

The anode material comprises a core, a transition layer, a shell layer from inside to outside; wherein, The shell layer is $Li_{1+x}Ni_{1-y-z}Co_yMn_zO_2$, wherein $-0.1 \leq x \leq 0.2$, $0.5 \leq y+z \leq 1$;

The transition layer is selected from the group consisting of: $Al_2O_3$, $ZrO_2$, MgO, $SiO_2$, $ZnO_2$, $TiO_2$, $Y_2O_3$, $LiAlO_2$, $Li_2ZrO_3$, or combination thereof;

The core is $Li_{1+r}Ni_{1-s-t}Co_sMn_tO_2$, wherein $-0.1 \leq r \leq 0.2$, $0 \leq s+t \leq 0.5$;

Optionally, the anode material further comprises protective layer outside the shell layer, wherein the protective layer is selected from the group consisting of: $Al_2O_3$, $ZrO_2$, MgO, $SiO_2$, $ZnO_2$, $TiO_2$, $Y_2O_3$, $LiAlO_2$, $Li_2ZrO_3$, or combination thereof.

Manufacturing Method

In a preferred embodiment of the invention, the manufacturing method of the invention includes the followed steps of:

(i) preparing a precursor (which is marked as P), in the atmosphere of air or inert gas, adding the solution containing Ni, Co, and Mn salts into an aqueous ammonia solution, while adjusting pH value to 7 to 14 by adding ammonia water and an alkaline solution, after precipitation, filtering, washing, and drying sedimentation to obtain the precursor $Ni_{1-s-t}Co_sMn_t(OH)_2$, $0 \leq s+t \leq 0.5$; wherein the inert gas is nitrogen, argon, or combination thereof; the Ni salt is selected from the group consisting of Ni sulfate, Ni nitrate, Ni chloride, and Ni acetate, or combination thereof; the Co salt is selected from the group consisting of Co sulfate, Co nitrate, Co chloride, acetates, or combination thereof; the Mn salt is selected from the group consisting of Mn sulfate, Mn nitrate, Mn chloride, Mn acetate, or combination thereof; the alkali is selected from the group consisting of NaOH, LiOH, and KOH, or combination thereof;

(ii) adding solution of A salt into the reaction vessel in which the precursor P is added, and adjusting pH with an alkali solution, so as to make the hydroxide of A settle or adsorbed on the surface of the precursor P. Wherein solution of A salt is selected from the group consisting of the soluble salt (such as sulfates, nitrates, chlorides, acetates) of Al, Mg, Zr, Fe, V, Ti, Sr, Cr, Zn, Cu, Ni, Co, Mn, Y, or combination thereof, and the molar ratio of A salt and the precursor P is between 0.01-0.30, the alkali solution is selected from the group consisting of NaOH, LiOH, KOH, or combination thereof. The final pH is controlled in different values according to the type of the salt selected, with the range of 1-14.

(iii) followed by addition of B salt solution, or B salt solution and alkali solution, adjusting pH to 2-14, so as to make the hydroxide of B continue settling down or being adsorbed on hydroxide of A. The sedimentation rate and crystal morphology can be controlled by adjusting the pH of the solution. The reaction completed solution is further being stirred for 5-24 hours, being filtered, and dried to get coated precursor, with the drying temperature of 50-200° C. Wherein B salt is selected from the group consisting of soluble salts such as sulfates, nitrates, chlorides, acetates of Ni, Co, Mn, or combination thereof; and the molar ratio of B salt to the precursor is between 0.01-0.30, the alkali is selected from the group consisting of NaOH, LiOH, and KOH, or combination thereof;

(iv) mixing the coated precursor with the lithium salt uniformly, sintering the uniformly mixed materials thus obtaining anode material. Wherein the molar ratio of lithium salt to the precursor is 0.9-1.2, and the lithium salt is selected from the group consisting of lithium carbonate, lithium hydroxide, lithium chloride, lithium nitrate, and lithium acetate, or combination thereof. The sintering atmosphere is selected from the group consisting of air, oxygen, nitrogen, argon, or combination thereof. Preferably, sintering temperature is divided into two sections, while the sintering temperature of the first section is 300-700° C., and is kept for 2-24 hours, and the sintering temperature of the second section is 700-1000° C., and is kept for 10-36 hours.

Further, in order to make the anode material remain stable under high voltage, a protective oxide layer can be added on the surface of the anode material. Specifically, the following steps are taken:

(iv) The material obtained in step (iv) was placed in water and stirred to form a dispersion liquid, and C salt solution is added, meanwhile alkali solution is also added to adjust pH value to 5-14, thus coating the surface of the sintered material with a layer of hydroxide of C, and obtaining an anode material coated with hydroxide of C on surface. After filtration, calcining to obtain anode material coated with oxide of C on surface.

Wherein the C salt is selected from the group consisting of the soluable salts of: Al, Mg, Zr, Fe, V, Ti, Sr, Cr, Zn, Cu, Ni, Co, Mn, Y, or combination thereof; the alkali solution is selected from the group consisting of NaOH, LiOH, and KOH, or combination thereof; the final pH is controlled in different values according to the type of the salt selected. The sintering temperature is 300-700° C., and the sintering atmosphere is air or oxygen.

According to the method of the present invention, a material for which the internal core is nickel cobalt lithium manganate material can be obtained, the shell layer is active material which can exist stably in the air, and the protective layer of the surface is oxide, which plays a protective role for electrode material.

According to the same idea, the technical process of the present invention can be applied to the preparation and modification processes of other materials such as $LiMn_2O_4$, lithium-rich, etc.

The above mentioned features of the present invention, or features mentioned in embodiments can be any combination. Any feature disclosed in the present specification can be used in combination with any other features, and each feature disclosed in the specification can be replaced with alternative feature which can serve an identical, equivalent, or similar purpose. Therefore, the features disclosed herein are only general exemplary examples of the equivalent or similar features, unless specifically indicated otherwise.

The main advantages of the present invention are as follows:

(1) It provides an anode material having novel structure.

(2) There is a transition layer within the anode material which effectively inhibits the nickel element of the core part from diffusing outward, and the anode material has low nickel surface, therefore overcoming the defect that being reduced easily and affecting the performance.

(3) The shell layer is active, which containing a high proportion of Co and/or Mn, as it is $Li_{1+x}Ni_{1-y-z}Co_yMn_zO_2$, wherein $-0.1 \leq x \leq 0.2$, $y+z \geq 0.5$.

(4) It can operate stably under high voltage, and it is of more cycle number than ordinary materials.

The present invention will be further illustrated below with reference to specific examples. It should be understood that these examples are only to illustrate the present invention but not to limit the scope of the present invention. For the experimental methods without particular conditions in the following examples, they are generally performed under conventional conditions or as instructed by the manufacturer.

General Method:

Mixing Uniformly the anode material, the conductive agent acetylene black and binder polyvinylidene fluoride (PVDF) in N-methylpyrrolidone (NMP) solvent, and the mass ratio of the anode material, the conductive agent and the binder is 85:10:5, then the uniformly mixed slurry was coated on an aluminum foil, vacuum dried for 12 hours under 120° C. to obtain a lithium-ion battery anode.

Using the above pole pieces as anode, metallic lithium as the cathode, 1 mol/L of lithium phosphate hexafluoride solution in ethylene carbonate and dimethyl carbonate as the electrolyte, polyethylene and polypropylene composite material of which the thickness is 20 micron thick as the membrane, to assemble a CR2032 type coin lithium-ion battery.

The charge and discharge test was conducted to the assembled coin cell, and the voltage range was 2.8-4.3 volts.

Comparative Example 1

Uncoated Anode Material

A mixed solution according to a molar ratio of 5:2:3 of Ni, Co, Mn was prepared. Nickel sulfate hexahydrate, cobalt sulfate heptahydrate and manganese sulfate monohydrate 131.42 g, 56.22 g, 50.70 g was separately weighed, and 500 mL of water was added to dissolve them. 1000 mL of 4 mol/L NaOH solution and 1000 mL of 2 mol/L ammonia solution were made.

In a reaction vessel with nitrogen protection, 200 mL of water was added, and the mixed solution was added together with 4 mol/L NaOH solution and 2 mol/L aqueous ammonia solution into the reaction vessel, and the final pH was controlled to 7-14. After settling down, the precipitate was filtered and washed, thus obtaining the precursor P1 after drying under 80° C., as showed in FIG. 1, which is of spherical shape.

50 g precursor P1 was weighed, and was mixed with the lithium salt by molar ratio of 1.1, 25.19 g $LiOH.H_2O$ was weighed and mixed uniformly with the precursor, sintered at 400° C. for 6 hours, then sintered at 850° C. for 12 hours, thus obtaining an anode material.

Comparative Example 2

Uncoated Anode Material

A mixed solution according to a molar ratio of 8:1:1 of Ni, Co, Mn was prepared, Nickel nitrate hexahydrate, cobalt nitrate hexahydrate, manganese nitrate tetrahydrate 232.63 g, 29.10 g, 25.10 g was separately weighed, and 500 mL of water was added to dissolve them. 1000 mL of 5 mol/L NaOH solution and 1000 mL of 2 mol/L ammonia solution were made.

Figure 2:
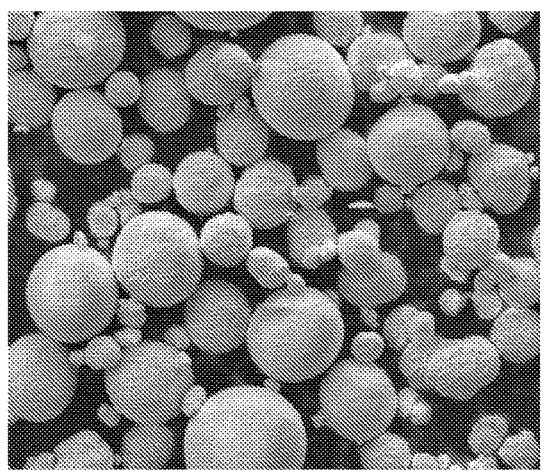
FIG. 2 shows scanning electron microscope pattern of the precursor, as prepared in comparative example 2.

In a reaction vessel with nitrogen protection, 200 mL of water was added, and the mixed solution was added together with 5 mol/L NaOH solution and 2 mol/L aqueous ammonia solution into the reaction vessel, and the final pH was controlled to 7-14. After settling down, the precipitate was filtered and washed, thus obtaining the precursor P2 after drying under 80° C., as showed in FIG. 2, which is of spherical shape.

100 g precursor P2 was weighed, and was mixed with the lithium salt by molar ratio of 1.05, 47.71 g $LiOH.H_2O$ was weighed and mixed uniformly with the precursor, sintered at 850° C. for 12 hours, thus obtaining an anode material.

Example 1

Preparation of Anode Material Having a Core and a Transition Layer 50 g precursor P1 was weighed; 200 mL of water was added and stirred to form dispersion liquid. An ammonia solution of 1 mol/L was made. 20.57 g $Zr(NO_3)_4$ was weighed, and 60 mL of water was added to dissolve it.

Figure 3:
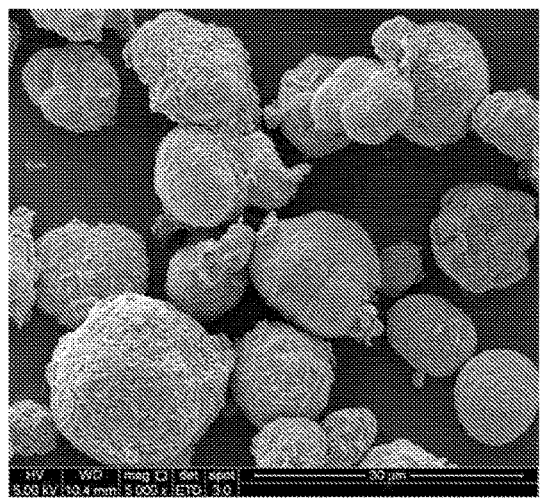
FIG. 3 shows scanning electron microscope pattern of the precursor, as prepared in example 1.

The $Zr(NO_3)_4$ solution was added into the dispersion liquid of the precursor P1, after that, pH was adjusted to 8.0 with aqueous ammonia. After filtered, washed with water for three times, and dried at 100° C., precursor P3 coated with $Zr(OH)_4$ was obtained, as shown in FIG. 3, which is of spherical shape.

10 g precursor P3 was weighed, the lithium salt and the precursor was mixed by molar ratio of 1.2. 5.50 g $LiOH.H_2O$ was weighed and uniformly mixed with the precursor P3, sintered at 580° C. for 6 hours, then sintered at 900° C. for 12 hours, thus obtaining anode material.

Example 2

Preparation of Anode Material Having a Core, a Transition Layer and a Shell Layer 50 g precursor P3 was weighed, 200 mL of water was added, and stirred to form dispersion liquid. 30.21 g $Co(CH_3COO)_2.4H_2O$ was weighed, and 60 mL of water was added to dissolve it. 4 mol/L NaOH solution and 1 mol/L ammonia solution were made.

Figure 4:
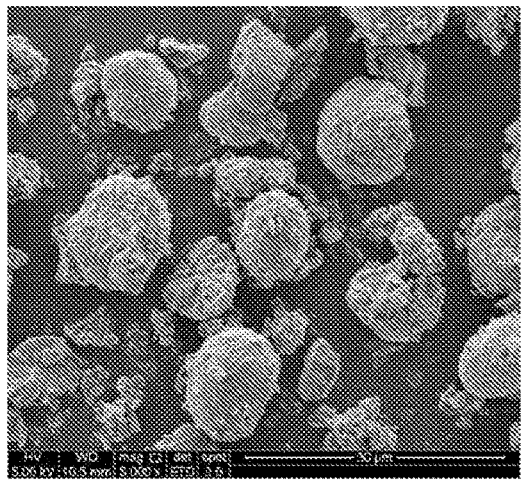
FIG. 4 shows scanning electron microscope pattern of the precursor, as prepared in example 2.

Co(CH$_3$COO)$_2$.4H$_2$O solution and 4 mol/L NaOH solution and aqueous ammonia solution are added together into the dispersion liquid of precursor, Co(OH)$_2$ was deposited on the surface of the precursor P3, while the pH was controlled to pH 12. After filtered and washed and dried under 100° C., the composite precursor P4 was obtained, as showed in FIG. 4, which is of spherical shape.

50 g precursor P4 was weighed, the lithium salt and the precursor was mixed by molar ratio of 1.1, 24.99 g LiOH.H$_2$O was weighed and uniformly mixed with the precursor P4, sintered at 480° C. for 6 hours, then sintered at 950° C. for 12 hours, thus obtaining anode material.

Example 3

Preparation of Anode Material Having a Core and a Transition Layer 50 g precursor P2 was weighed, 200 mL of water was added, and stirred to form dispersion liquid. 1 mol/L ammonia solution was made. 20.57 g Zr(NO$_3$)$_4$ was weighed, and 60 mL of water was added to dissolve it.

Figure 5:
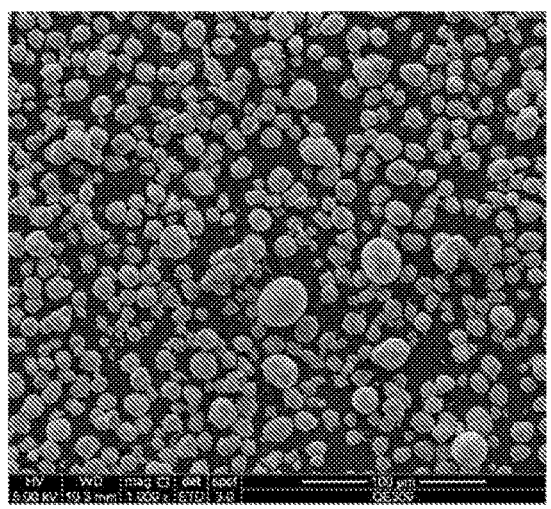
FIG. 5 shows scanning electron microscope pattern of the precursor, as prepared in example 3.

The Zr(NO$_3$)$_4$ solution was added into the dispersion liquid of the precursor P2, after that, pH was adjusted to 8.0 with aqueous ammonia. After filtered, washed with water for three times, and dried at 100° C. to obtain the precursor P5 coated with Zr(OH)$_4$, as shown in FIG. 5, which is of spherical shape.

10 g precursor P5 was weighed, the lithium salt and the precursor was weighed by molar ratio of 1.2, 5.50 g LiOH.H$_2$O was weighed and uniformly mixed with the precursor P4, sintered at 580° C. for 6 hours, then sintered at 900° C. for 12 hours, thus obtaining anode material.

Example 4

Preparation of Anode Material Having a Core, a Transition Layer and a Shell Layer 50 g precursor P5 was weighed, 200 mL of water was added, and stirred to form dispersion liquid. 30.21 g Co(CH$_3$COO)$_2$.4H$_2$O was weighed, and 30 mL of water was added to dissolve it. 4 mol/L LiOH solution and 1 mol/L ammonia solution are made.

Figure 6:
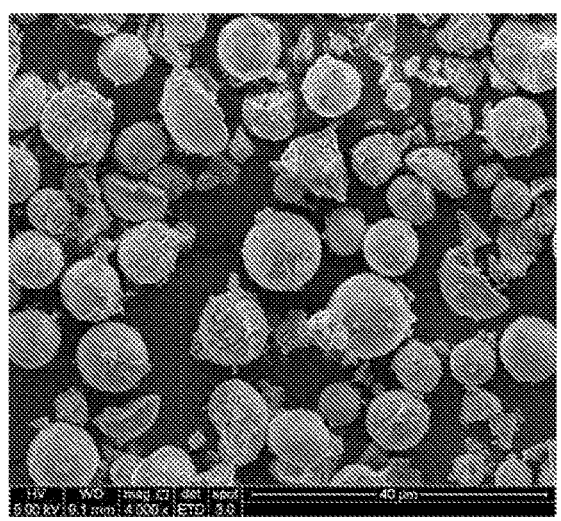
FIG. 6 shows scanning electron microscope pattern of the precursor, as prepared in example 4.
Figure 7:
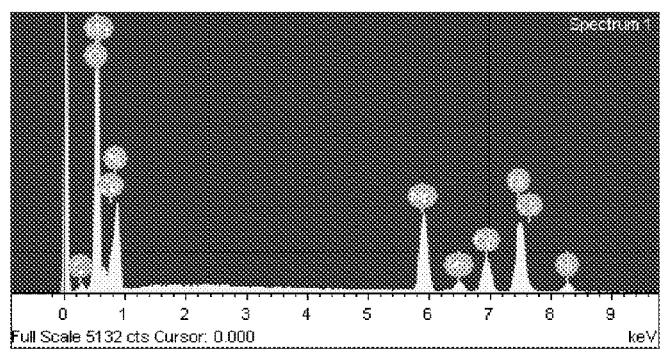
FIG. 7 shows EDS energy spectrum of the precursor, as prepared in comparative example 1.
Figure 8:
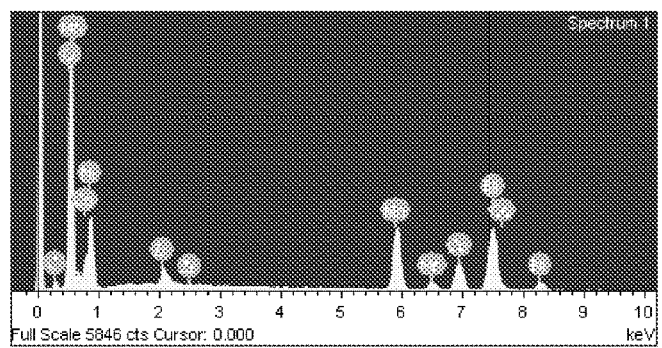
FIG. 8 shows EDS energy spectrum of the precursor, as prepared in comparative example 2.
Figure 9:
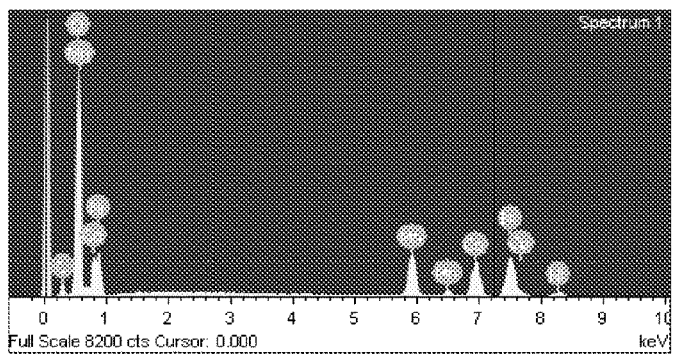
FIG. 9 shows EDS energy spectrum of the precursor, as prepared in example 1.
Figure 10:
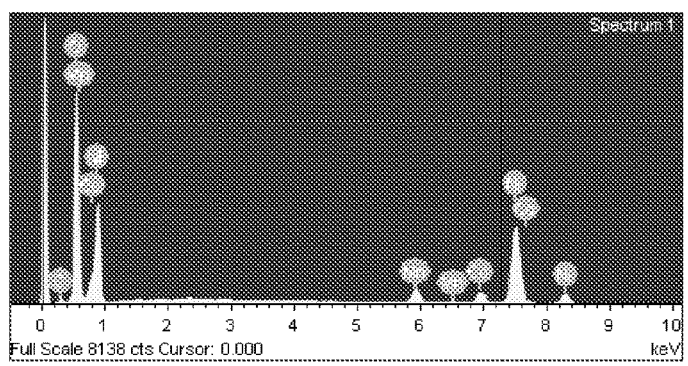
FIG. 10 shows EDS energy spectrum of the precursor, as prepared in example 2.
Figure 11:
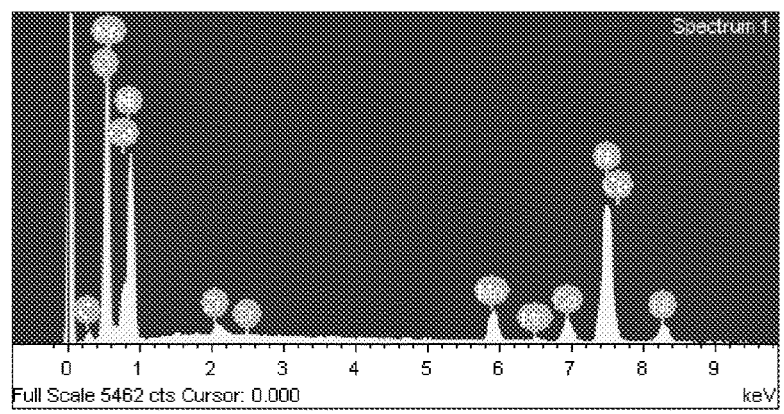
FIG. 11 shows EDS energy spectrum of the precursor, as prepared in example 3.
Figure 12:
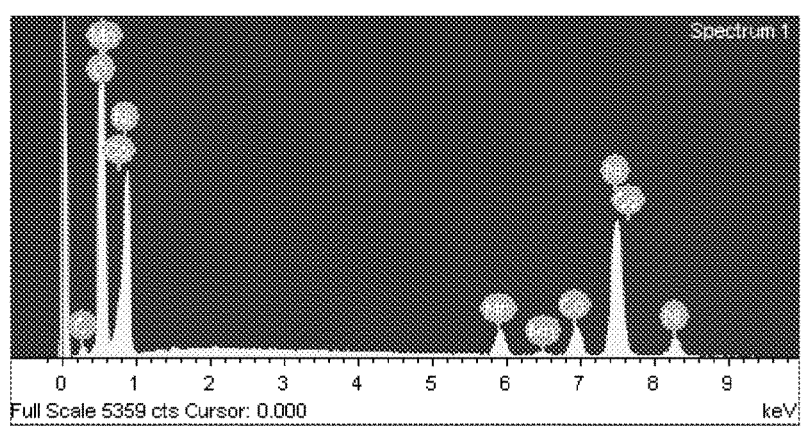
FIG. 12 shows EDS energy spectrum of the precursor, as prepared in example 4.

Co(CH$_3$COO)$_2$ solution with 4 mol/L NaOH solution and aqueous ammonia solution was added together into the dispersion liquid of precursor, Co(OH)$_2$ was deposited on the surface of the precursor P5, while the deposition pH was controlled to 12. After filtered, washed and dried under 100° C., the composite precursor P6 was obtained as showed in FIG. 6, which is of spherical shape.

50 g precursor P6 was weighed, the lithium salt and the precursor was mixed by molar ratio 1.1, 24.99 g LiOH.H$_2$O was weighed and uniformly mixed with the precursor P6, sintered at 480° C. for 6 hours, then sintered at 950° C. for 12 hours, thus obtaining anode material.

Example 5

Preparation of Anode Material Having a Core, a Transition Layer, a Shell Layer and a Protective Layer 50 g anode material in the example 2 was weighed; 100 mL of water was added, and stirred to form dispersion liquid. 2.78 g Al(NO$_3$)$_3$.9H$_2$O was weighed, and dissolved in 50 mL of water, and 1 mol/L NaOH solution was made.

Al(NO$_3$)$_3$ solution together with NaOH solution was slowly added into the dispersion liquid of anode material. Al(OH)$_3$ was deposited on the surface of the anode material, while the final pH is 7.5. After filtered and washed, and sintered at 500° C. for 6 hours, the anode material coated with Al$_2$O$_3$ was obtained.

Example 6

Preparation of Anode Material Having a Core, a Transition Layer, a Shell Layer and a Protective Layer 50 g anode material in the example 4 was weighed, 100 mL of water was added to form dispersion liquid. 3.66 g Al$_2$(SO$_4$)$_3$.18H$_2$O was weighed, dissolved in 60 mL of water, and 0.5 mol/L NaOH solution was made.

The Al$_2$(SO$_4$)$_3$ solution together with NaOH solution was slowly added into the dispersion liquid of anode material. Al(OH)$_3$ was deposited on the surface of the anode material, while the final pH is 8.0. After filtered washed and sintered at 550° C. for 4 hs, the anode material coated with Al$_2$O$_3$ was obtained.

Example 7

Performance Testing

EDS spectrum is used to detect the anode material prepared in Comparative Examples and Examples, the spectrum is shown in FIGS. 7 to 12.

Table 1 shows the test results of the EDS spectrum of the surface of the anode material prepared in the Comparative Example 1, Example 1, Example 2, wherein the nickel content of the surface of the anode material of Example 2 is lower than that of Comparative Example 1 and Example 1, Zr element content of the surface of anode material in Example 1 is 5.44 mol %, while Zr content is zero in the EDS spectrum test of the surface of anode material in Example 2, which indicates that the Zr coating layer has a good inhibition of the diffusion of nickel elements of the core during sintering, thus resulting in a lower nickel content on the material surface.

Figure 13:
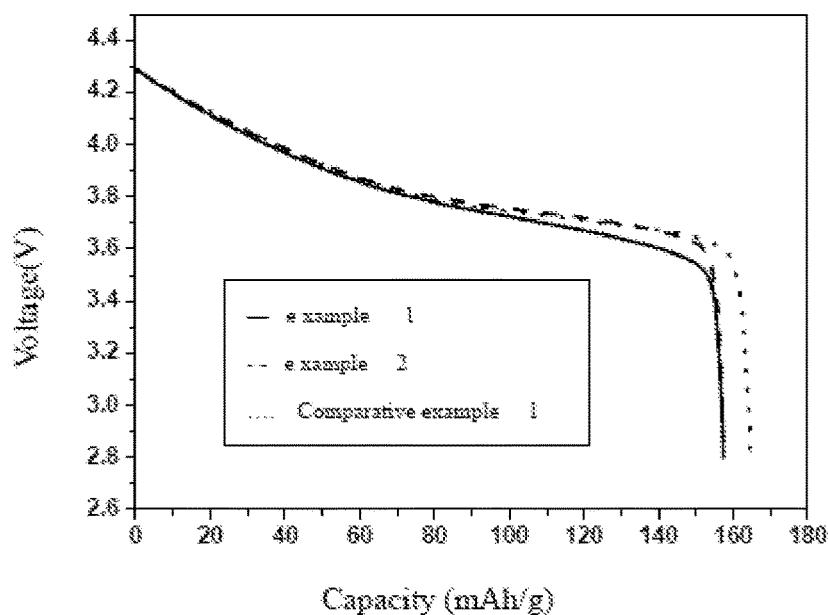
FIG. 13 shows discharge curves comparison chart of comparative example 1, example 1, and example 2.
Figure 14:
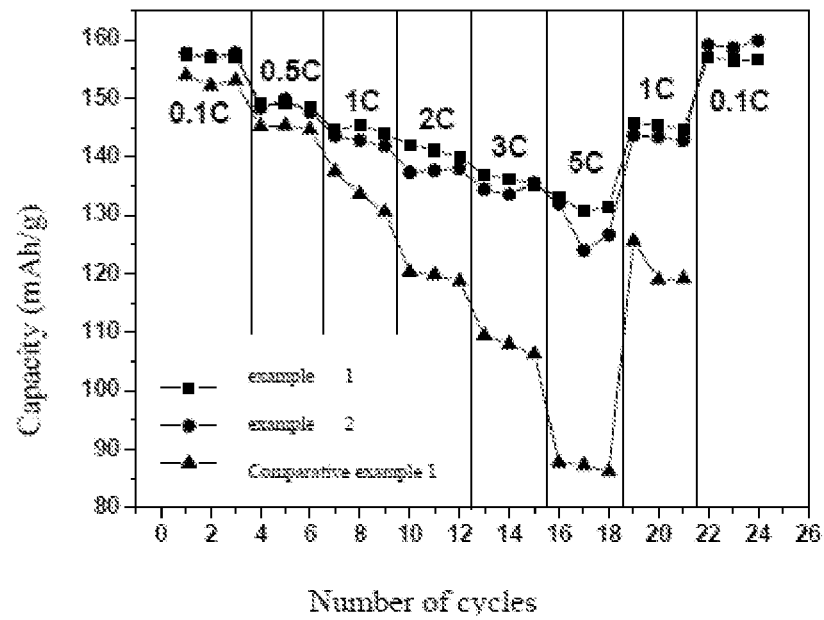
FIG. 14 shows rate performance comparison chart of comparative example 1, example 1, and example 2.

FIG. 13 shows discharge curves comparison chart of materials in Comparative Example 1, Example 1, and Example 2. It can be seen by the contrast that the discharge capacity of the anode material prepared by mixing with a lithium salt and sintering after being coated with Zr(OH)$_4$ and Co(OH)$_2$ on the precursor, is similar to the uncoated sample. FIG. 14 shows rate performance comparison chart of materials in Comparative Example 1, Example 1, Example 2, it can be seen by the contrast that the rate performance of the anode material prepared by mixing with a lithium salt and sintering after being coated with Zr(OH)$_4$ and Co(OH)$_2$ on the precursor is improved.

TABLE 1

Contrast of EDS test results of the materials

|  |  | Ni | Co | Mn | Zr |
|---|---|---|---|---|---|
| Comparative example 1 | mol % | 49.66 | 20.24 | 30.10 | 0 |
| Example 1 | mol % | 48.37 | 19.13 | 27.05 | 5.44 |
| Example 2 | mol % | 33.09 | 52.22 | 14.68 | 0 |

Table 2 shows the test results of the EDS spectrum of the surface of the anode material prepared in the Comparative Example 2, Example 3, Example 4, wherein the nickel content of the surface of the anode material of Example 4 is lower than that of Comparative Example 2 and Example 3, Zr element content of the surface of anode material in Example 2 is 1.90 mol %, while Zr content is zero in the EDS spectrum test of the surface of anode material in Example 3, which indicates that the Zr coating layer has a good inhibition of the diffusion of nickel elements of the core during sintering, thus resulting in a lower nickel content on the material surface.

Figure 15:
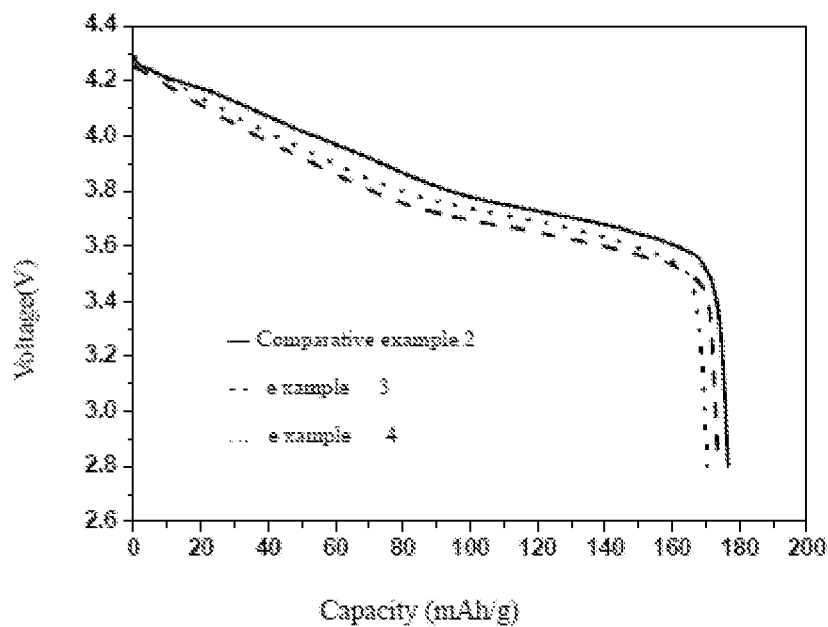
FIG. 15 shows discharge curves comparison chart of comparative example 2, example 3, and example 4.
Figure 16:
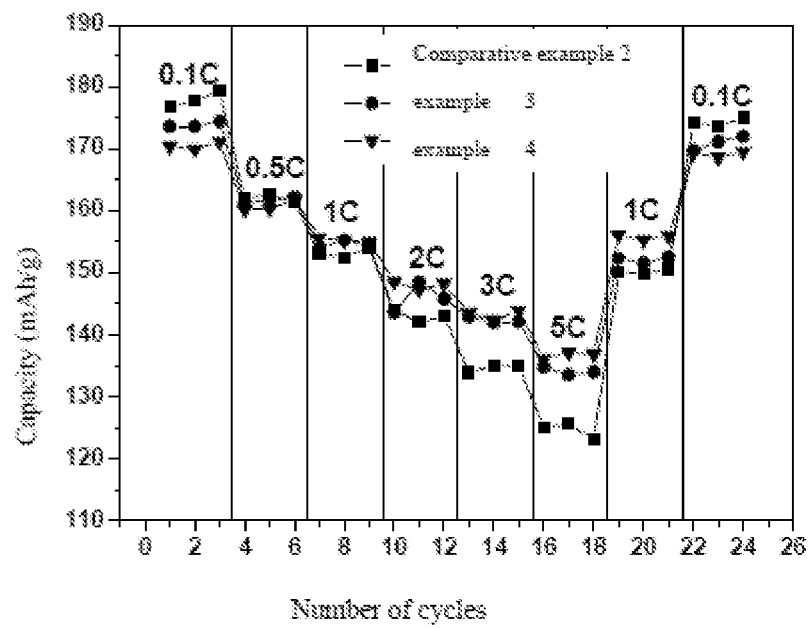
FIG. 16 shows rate performance comparison chart of comparative example 2, example 3, and example 4.

FIG. 15 shows discharge curves comparison chart of materials in Comparative Example 2, Example 3, Example 4, it can be seen by the contrast that after being coated with $Zr(OH)_4$ and $Co(OH)_2$ on the precursor, the discharge capacity is similar to the uncoated sample. FIG. 16 shows rate performance comparison chart of the materials in Comparative Example 1, Example 1, Example 2, it can be seen by the contrast that the rate performance of the material is improved after being coated.

TABLE 2

Contrast of EDS test results of the materials

|  |  | Ni | Co | Mn | Zr |
|---|---|---|---|---|---|
| Comparative example 2 | mol % | 80.26 | 10.03 | 9.71 | 0 |
| Example 3 | mol % | 79.23 | 9.85 | 9.02 | 1.90 |
| Example 4 | mol % | 52.93 | 40.66 | 7.41 | 0 |

It is tested that the discharge capacity and the rate performance of the anode material prepared in Example 5 are similar to those prepared in Example 2, Example 6 and Example 4, which is of high capacity retention rate and good cyclicity.

The cycle retention rate of the anode materials prepared in Example 1 and Example 2 are higher than that prepared in Comparative Example 1. Similarly, the cycle retention rate of the anode materials prepared in Example 3 and Example 4 are higher than that prepared in Comparative Example 2, which indicates that after adding the transition layer and the shell layer on the spherical particle surface, the cycle performance of the anode material is improved. The cycle retention rate of the anode material prepared in Example 5 under high voltage is higher than that prepared in Comparative Example 1, which indicates that after adding the protective layer, the cycle performance under high voltage of the modified anode material is improved.

Figure 17:
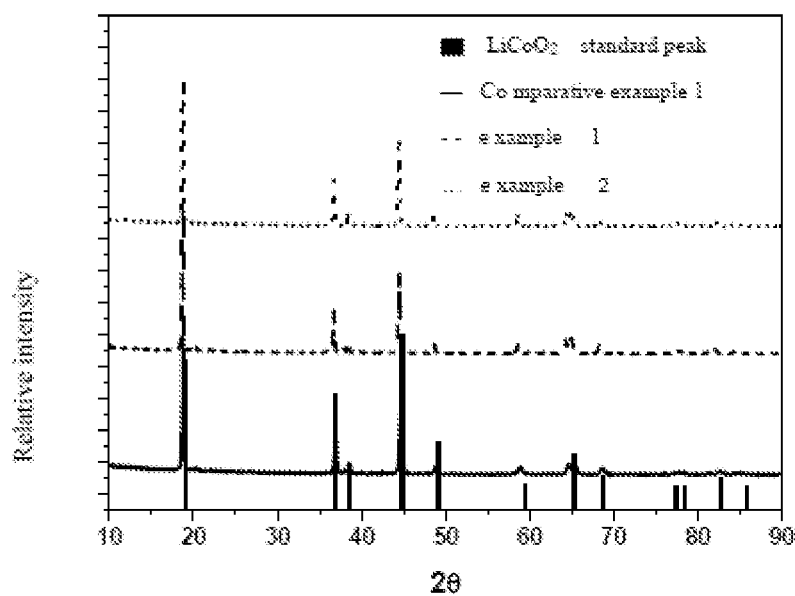
FIG. 17 shows X-ray diffraction comparison pattern of comparative example 1, example 1, and example 2.

FIG. 17 shows X-ray diffraction comparison pattern of Comparative Example 1, Example 1, and Example 2. The diffraction peak position of which is the same to that of $LiCoO_2$ (refer to ICSD 98-024-6414) having α-$NaFeO_2$ type lattice structure, and space group of R-3mH. Therefore, it can be considered that the synthetic material has α-$NaFeO_2$ type crystal structure with a R-3mH space group.

All literatures mentioned in the application are incorporated by reference herein, as though individually incorporated by reference. Additionally, it should be understood that after reading the above teaching, many variations and modifications may be made by the skilled in the art, and these equivalents also fall within the scope as defined by the appended claims.

We claim:

1. An anode material, wherein the anode material comprises a core, a transition layer, and a shell layer from inside to outside, wherein
    the shell layer is $Li_{1+x}Ni_{1-y-z}Co_yMn_zO_2$, wherein $-0.1 \leq x \leq 0.2$, and $0.5 \leq y+z \leq 1$;
    the transition layer is selected from the group consisting of: $Al_2O_3$, $ZrO_2$, MgO, $SiO_2$, $ZnO_2$, $TiO_2$, $Y_2O_3$, $LiAlO_2$, $Li_2ZrO_3$, or combination thereof;
    the core is $Li_{1+r}Ni_{1-s-t}Co_sMn_tO_2$, wherein $-0.1 \leq r \leq 0.2$, and $0 \leq s+t \leq 0.5$;
    the anode material further comprises a protective layer outside the shell layer, wherein the protective layer is selected from the group consisting of: $Al_2O_3$, $ZrO_2$, MgO, $SiO_2$, $ZnO_2$, $TiO_2$, $Y_2O_3$, $LiAlO_2$, $Li_2ZrO_3$, or combinations thereof; and wherein the anode material further comprises the following characteristics:
    (1) the shell layer and the core layer are both α-$NaFeO_2$ type lattice structure with a R-3mH space group;
    (2) the anode material has 1 to 10 layers of the transition layer and/or 1 to 10 layers of the shell layer; and
    (3) the Ni content in the core is greater than that in the shell layer.

2. The anode material of claim 1, wherein the core is $LiNi_{0.8}Co_{0.1}Mn_{0.1}O_2$; the transition layer is $Li_2ZrO_3$; the shell layer is $LiNi_{1-y}Co_yMn_zO_2$, wherein $0.5 \leq y+z \leq 1$.

3. A manufacturing method for preparing the anode material of claim 1, wherein the method comprises the following steps:
    (a) providing a solution containing Ni, Co, and Mn salts, and preparing a precursor $Ni_{1-s-t}Co_sMn_t(OH)_2$, $0 \leq s+t \leq 0.5$;
    (b) depositing a precursor of transition layer onto surface of the precursor $Ni_{1-s-t}Co_sMn_t(OH)_2$, thereby obtaining a precursor P20;
    (c) depositing a precursor of shell layer onto surface of the precursor P20, thereby obtaining a precursor P30;
    (d) mixing the precursor P30 and the lithium salt uniformly, and sintering, thereby obtaining the anode material.

4. The manufacturing method of claim 3, wherein in step (a), in the atmosphere of air or inert gas, adding the solution containing Ni, Co, and Mn salts into an aqueous ammonia solution, while adjusting pH value to 7 to 14 by adding ammonia water and an alkaline solution; after precipitation, filtering, washing, and drying sedimentation to obtain the precursor $Ni_{1-s-t}Co_sMn_t(OH)_2$, $0 \leq s+t \leq 0.5$; wherein the inert gas is nitrogen, argon, or combination thereof, the Ni salt is selected from the group consisting of Ni sulfate, Ni nitrate, Ni chloride, Ni acetate, or combination thereof; the Co salt is selected from the group consisting of Co sulfate, Co nitrate, Co chloride, Co acetates, or combination thereof; the Mn salt is selected from the group consisting of Mn sulfate, Mn nitrate, Mn chloride, Mn acetate, or combination thereof; the alkali is selected from the group consisting of NaOH, LiOH, KOH, or combination thereof; and/or
    in step (b), the precursor of transition layer is hydroxide of A; wherein the A is selected from the group consisting of Al, Mg, Zr, Fe, V, Ti, Sr, Cr, Zn, Cu, Ni, Co, Mn, Y, or combination thereof; and/or
    in step (c), the precursor of shell layer is hydroxide of B; wherein the B is selected from the group consisting of Ni, Co, Mn or combination thereof; and/or
    in step (d), the lithium salt is lithium carbonate, lithium hydroxide, lithium chloride, lithium nitrate, lithium acetate, or combination thereof.

5. The manufacturing method of claim 3, wherein the method comprises the following step of:
(e) preparing a protective layer on surface of the anode material obtained in step (d), wherein the protective layer is oxide of C, while the C is selected from the group consisting of: Al, Mg, Zr, Fe, V, Ti, Sr, Cr, Zn, Cu, Ni, Co, Mn, Y, or combination thereof.

6. The manufacturing method of claim 3, wherein in step (b), the precursor of transition layer is hydroxide of A; wherein the A is selected from the group consisting of Al, Mg, Zr, Fe, V, Ti, Sr, Cr, Zn, Cu, Ni, Co, Mn, Y, or combination thereof; and
in step (b), the precursor of shell layer is hydroxide of B; wherein the B is selected from the group consisting of Ni, Co, Mn, or combination thereof.

7. A lithium-ion battery, wherein the battery comprises the anode material of claim 1.

8. The anode material of claim 1, wherein the anode materials is of spherical structure.

9. The anode material of claim 1, wherein a thickness of the transition layer is about 1 nm to about 50 nm, a thickness of the shell layer is about 50 nm to about 4 μm, and a thickness of the protective layer is about 1 nm to about 50 nm.

10. The anode material of claim 1, wherein the anode material has 1 to 5 layers of the transition layer and/or 1 to 5 layers of the shell layer.

11. The anode material of claim 1, wherein the anode material has 1 to 3 layers of the transition layer and/or 1 to 3 layers of the shell layer.

* * * * *